UNITED STATES PATENT OFFICE.

OSCAR A. TANNER, OF JERSEY CITY, NEW JERSEY.

ARTIFICIAL STONE.

SPECIFICATION forming part of Letters Patent No. 380,830, dated April 10, 1888.

Application filed September 12, 1887. Serial No. 249,407. (No specimens.)

*To all whom it may concern:*

Be it known that I, OSCAR A. TANNER, a citizen of the United States, residing at Jersey City, in the county of Hudson and State of New Jersey, have invented a new and useful Improvement in Artificial Stone, of which the following is a specification.

My invention consists in a new composition intended as a substitute for natural stone, slate, or earthenware for all or most of the purposes for which those substances are used, as for architectural work, cemetery work, and articles of domestic use, among which may be mentioned mantels, laundry and bath tubs, wash-stands, table-tops, and tombstones.

The composition consists of brimstone, plumbago, silica, paraffine, and coal-tar, the proportions of which may be varied according to the purpose for which the composition is to be applied. The proportions, by weight, which I consider to be the best for most purposes are as follows: brimstone, fifty parts; plumbago, twenty parts; silica, twenty-five parts; paraffine, five parts; coal-tar, two parts.

To manufacture the composition the plumbago and silica are finely powdered, and then with the brimstone, paraffine, and coal-tar are placed in a suitable vessel and heated to a sufficient temperature to fuse the brimstone. The mixture when thus heated is stirred to produce the intimate incorporation of the several ingredients, and while in a state of fusion the composition may be poured into molds of suitable form to produce the various articles desired, or simply run into slabs by pouring onto flat surfaces of metal or other material.

I have found by experiment that the proportions of the several ingredients hereinabove given may be varied quite considerably without essentially impairing or changing the character of my composition. For instance, I may use forty to sixty parts of brimstone, fifteen to twenty-five parts of plumbago, twenty to thirty parts of silica, five to ten parts of paraffine, and two to five parts of coal-tar. I therefore do not limit myself to the precise proportions hereinabove specified.

The compound above described may form, without other ingredients, an artificial stone; or it may be used as a stone-base and other ingredients—such as soapstone, for example—commingled therewith.

What I claim as my invention, and desire to secure by Letters Patent, is—

The composition of brimstone, plumbago, silica, paraffine, and coal-tar, in proportions substantially as herein described, for the purpose set forth.

OSCAR A. TANNER.

Witnesses:
C. HALL,
MINERT LINDEMAN.